US008702498B2

(12) United States Patent
Visser

(10) Patent No.: US 8,702,498 B2

(45) Date of Patent: Apr. 22, 2014

(54) METHOD OF GAMING, A GAME CONTROLLER AND A GAMING SYSTEM INCLUDING OBJECTS MOVING TO STOPPING PLACES RELATIVE TO THE REELS

(75) Inventor: Antoon Christiaan Visser, Coogee (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 13/340,099

(22) Filed: Dec. 29, 2011

(65) Prior Publication Data

US 2012/0094747 A1 Apr. 19, 2012

Related U.S. Application Data

(63) Continuation of application No. 12/356,970, filed on Jan. 21, 2009, now abandoned.

(30) Foreign Application Priority Data

Jan. 21, 2008 (AU) ................................ 2008900272

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.

USPC ............................................... 463/20; 463/25

(58) Field of Classification Search

USPC ..................................................... 463/20, 25

See application file for complete search history.

(56) References Cited

U.S. PATENT DOCUMENTS

| | | | | |
|---|---|---|---|---|
| 2003/0027629 A1* | 2/2003 | Pimienta | ......................... | 463/25 |
| 2003/0069062 A1* | 4/2003 | Shimizu | .......................... | 463/20 |
| 2006/0040728 A1* | 2/2006 | Fuller | ............................ | 463/20 |
| 2009/0197668 A1 | 8/2009 | Visser | | |

FOREIGN PATENT DOCUMENTS

| | | |
|---|---|---|
| AU | 1333188 | 9/1988 |
| AU | 721968 | 6/1998 |

OTHER PUBLICATIONS

United States Patent and Trademark Office, "Non-Final Office Action," issued in connection with U.S. Appl. No. 12/356,970, mailed Jun. 29, 2011, 17 pages.

* cited by examiner

*Primary Examiner* — William M. Brewster

(74) *Attorney, Agent, or Firm* — Hanley, Flight and Zimmerman, LLC

(57) ABSTRACT

A method of gaming comprising: displaying a plurality of objects as moving relative to one or more stopping places on a display; conducting an evaluation in respect of at least some of the objects to determine whether the at least some objects contribute to an award event; and stopping each object that contributes to an event at a stopping place of one or more stopping places.

44 Claims, 7 Drawing Sheets

METHOD OF GAMING, A GAME CONTROLLER AND A GAMING SYSTEM INCLUDING OBJECTS MOVING TO STOPPING PLACES RELATIVE TO THE REELS

CROSS-REFERENCE TO RELATED APPLICATIONS

This patent arises as a continuation of and claims priority to U.S. patent application Ser. No. 12/356,970, filed Jan. 21, 2009, entitled "A METHOD OF GAMING, A GAME CONTROLLER AND A GAMING SYSTEM," which claims the benefit of priority to Australian Provisional Patent Application No. 2008900272, filed on Jan. 21, 2008, entitled "A METHOD OF GAMING, A GAME CONTROLLER AND A GAMING SYSTEM", each of which is herein incorporated by reference in its entirety.

FIELD

The invention relates to a method of gaming, a game controller and a gaming system.

BACKGROUND

Many gaming machines provide spinning reel or "slot" games where a plurality of reels are spun to stop positions and prizes are evaluated based on the symbols displayed when the symbols are stopped.

While such gaming systems provide users with enjoyment, a need exists for alternative gaming systems in order to maintain or increase player enjoyment.

SUMMARY OF THE INVENTION

In a first aspect, the invention provides a method of gaming including:

displaying a plurality of objects as moving relative to one or more stopping places on a display;

conducting an evaluation in respect of at least some of the objects to determine whether the at least some objects contribute to an award event; and stopping each object that contributes to an event at a stopping place of one or more stopping places.

In an embodiment, the method includes displaying the objects as moving by falling relative to the one or more stopping places.

In an embodiment, the method includes conducting an evaluation in respect of each object.

In an embodiment, the award event is a jackpot evaluation.

In an embodiment, the award event is adding a symbol to a display position of a plurality of display positions used in evaluating an award.

In an embodiment, the method includes evaluating a jackpot in respect of the added symbol.

In an embodiment, a plurality of added symbols are required in order to award the jackpot.

In an embodiment, the method includes displaying the objects as moving relative to a base game.

In an embodiment, conducting an evaluation includes selecting one of a set of outcomes for each object.

In an embodiment, the objects are coins and the sides of the coins correspond to two different outcomes.

In an embodiment, at least one outcome is represented by an object not stopping at a stopping place.

In an embodiment, the method includes displaying the moving objects in response to a trigger event.

In a second aspect, the invention provides a game controller for a gaming system, the game controller arranged to:

control a display to display a plurality of objects as moving relative to one or more stopping places on a display;

conduct an evaluation in respect of at least some of the objects to determine whether the at least some objects contribute to an award event; and stop each object that contributes to an event at a stopping place of one or more stopping places.

In an embodiment, the game controller includes a moving object controller arranged to control display of the moving and stopping of objects.

In an embodiment, the game controller includes an evaluator arranged to conduct the evaluation.

In an embodiment, the game controller is constituted by a processor arranged to execute program code stored in a memory.

In an embodiment, the game controller is arranged to control the display to display the objects as moving by falling relative to the one or more stopping places.

In an embodiment, the game controller is arranged to conduct an evaluation in respect of each object.

In an embodiment, the award event is a jackpot evaluation.

In an embodiment, the award event is adding a symbol to a display position of a plurality of display positions used in evaluating an award.

In an embodiment, the game controller is arranged to evaluate a jackpot in respect of the added symbol.

In an embodiment, a plurality of added symbols are required in order to award the jackpot.

In an embodiment, the game controller is arranged to control the display to display the objects as moving relative to a base game.

In an embodiment, the game controller is arranged to conduct an evaluation by selecting one of a set of outcomes for each object.

In an embodiment, the objects are coins and the sides of the coins correspond to two different outcomes.

In an embodiment, at least one outcome is represented by an object not stopping at a stopping place.

In an embodiment, the game controller is arranged to cause the display to display the moving objects in response to a trigger event.

In a third aspect, the invention provides a gaming system including:

a display; and a game controller arranged to:

- control the display to display a plurality of objects as moving relative to one or more stopping places;
- conduct an evaluation in respect of at least some of the objects to determine whether the at least some objects contribute to an award event; and
- stop each object that contributes to an event at a stopping place of one or more stopping places on the display.

In an embodiment, the display forms part of a player interface including a game play mechanism operable by a player to play a game during which the objects are displayed.

In an embodiment, the game controller includes a moving object controller arranged to control display of the moving and stopping of objects.

In an embodiment, the game controller includes an evaluator arranged to conduct the evaluation.

In an embodiment, the game controller is constituted by a processor arranged to execute program code stored in a memory.

In an embodiment, the gaming system is arranged to display the objects as moving by falling relative to the one or more stopping places.

In an embodiment, the game controller is arranged to conduct an evaluation in respect of each object.

In an embodiment, the award event is a jackpot evaluation.

In an embodiment, the award event is adding a symbol to a display position of a plurality of display positions used in evaluating an award.

In an embodiment, the gaming system is arranged to evaluate a jackpot in respect of the added symbol.

In an embodiment, a plurality of added symbols are required in order to award the jackpot.

In an embodiment, the gaming system is arranged to display the objects as moving relative to a base game.

In an embodiment, the game controller is arranged to conduct an evaluation by selecting one of a set of outcomes for each object.

In an embodiment, the objects are coins and the sides of the coins correspond to two different outcomes.

In an embodiment, at least one outcome is represented by an object not stopping at a stopping place.

In an embodiment, the gaming system is arranged to display the moving objects in response to a trigger event.

In a fourth aspect, the invention provides a method of gaming including:

displaying a plurality of objects as moving relative to an evaluation place; and displaying an outcome of an evaluation in respect of each of at least some of the objects in response to each object of the at least some of the objects reaching the evaluation place.

In an embodiment, the method includes selecting one of a set of outcomes for each object.

In an embodiment, the objects are coins and the sides of the coins correspond to two different outcomes.

In an embodiment, at least one outcome is represented by an object not stopping at the evaluation place.

In a fifth aspect, the invention provides a game controller for a gaming system, the game controller arranged to:

control a display to display a plurality of objects as moving relative to an evaluation place; and control a display to display an outcome of an evaluation in respect of each of at least some of the objects in response to each object of the at least some of the objects reaching the evaluation place.

In an embodiment, the game controller is arranged to select one of a set of outcomes for each object.

In an embodiment, the objects are coins and the sides of the coins correspond to two different outcomes.

In an embodiment, at least one outcome is represented by an object not stopping at the evaluation place.

In a sixth aspect, the invention provides a gaming system including:

a display; and a game controller arranged to:

control the display to display a plurality of objects as moving relative to an evaluation place; and control the display to display an outcome of an evaluation in respect of each of at least some of the objects in response to each object of the at least some of the objects reaching the evaluation place.

In an embodiment, the game controller is arranged to select one of a set of outcomes for each object.

In an embodiment, the objects are coins and the sides of the coins correspond to two different outcomes.

In an embodiment, at least one outcome is represented by an object not stopping at the evaluation place.

In a seventh aspect, the invention provides computer program code which when executed implements one or both of the above methods.

In an eighth aspect, the invention provides a computer readable medium including the above program code.

In a ninth aspect, the invention provides a data signal including the above program code.

In a tenth aspect, the invention extends to transmitting the above program code.

BRIEF DESCRIPTION OF DRAWINGS

Certain exemplary embodiments of the invention will now be described with reference to the accompanying drawings in which.

Figure 1:
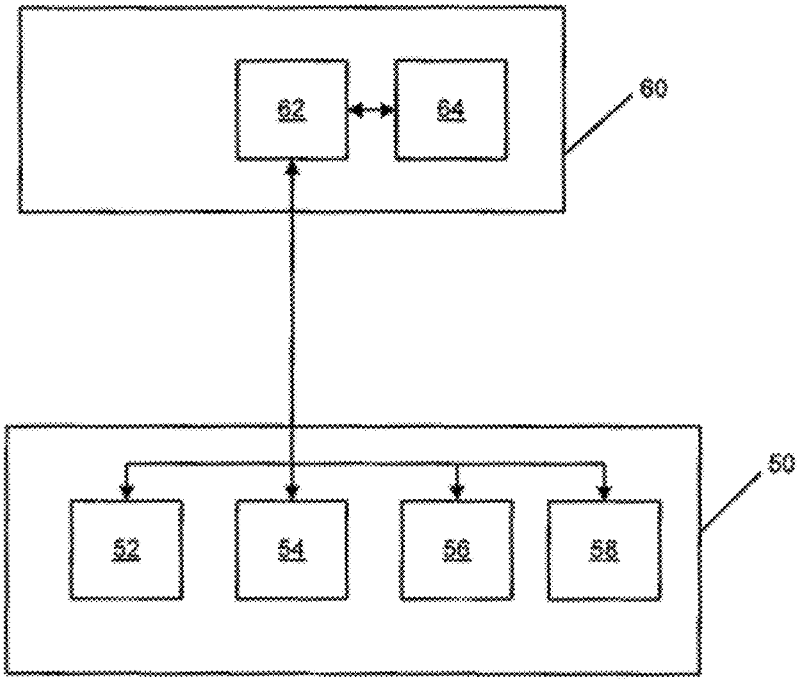
FIG. 1 is a block diagram of the core components of a gaming system.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

Referring to the drawings, there is shown a gaming system having a game controller arranged to implement a game where objects are displayed as moving (e.g. as falling) relative to stopping positions. In an embodiment, objects which relate to an award event, such as objects which can form part of a winning combination, are stopped at the stopping positions while other objects keep moving.

General Construction of Gaming System

The gaming system can take a number of different forms. In a first form, a stand alone gaming machine is provided wherein all or most components for implementing the game are present in a player operable gaming machine.

In a second form, a distributed architecture is provided wherein some of the components for implementing the game are present in a player operable gaming machine and some of the components for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system includes several core components. At the broadest level, the core components are a player interface 50 and a game controller 60 as illustrated in FIG. 1. The player interface is arranged to enable manual interaction between a player and the gaming system and for this purpose includes the input/output components for the player to enter instructions and play the game.

Components of the player interface may vary from embodiment to embodiment but will typically include a credit mechanism 52 to enable a player to input credits and receive payouts, one or more displays 54, a game play mechanism 56 that enables a player to input game play instructions (e.g. to place bets), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
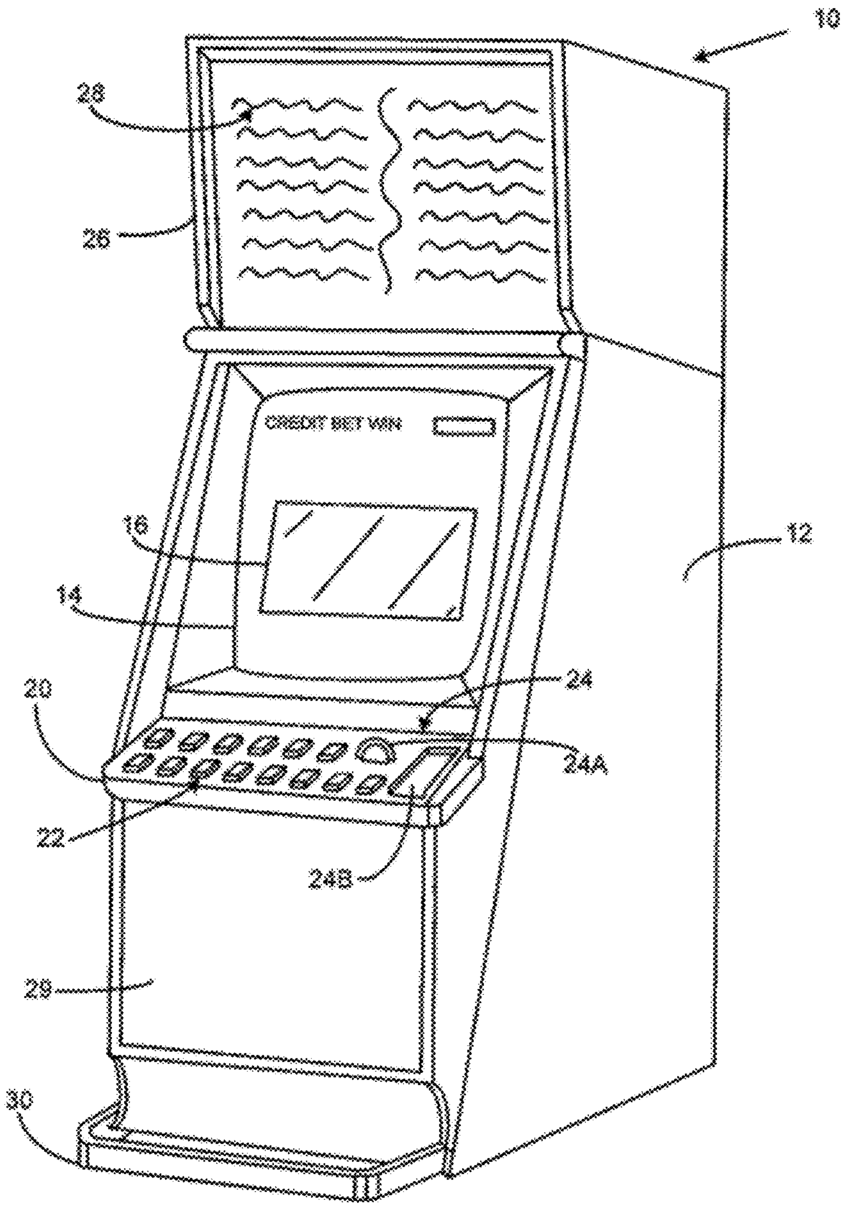
FIG. 2 is a perspective view of a stand alone gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module (not shown) having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
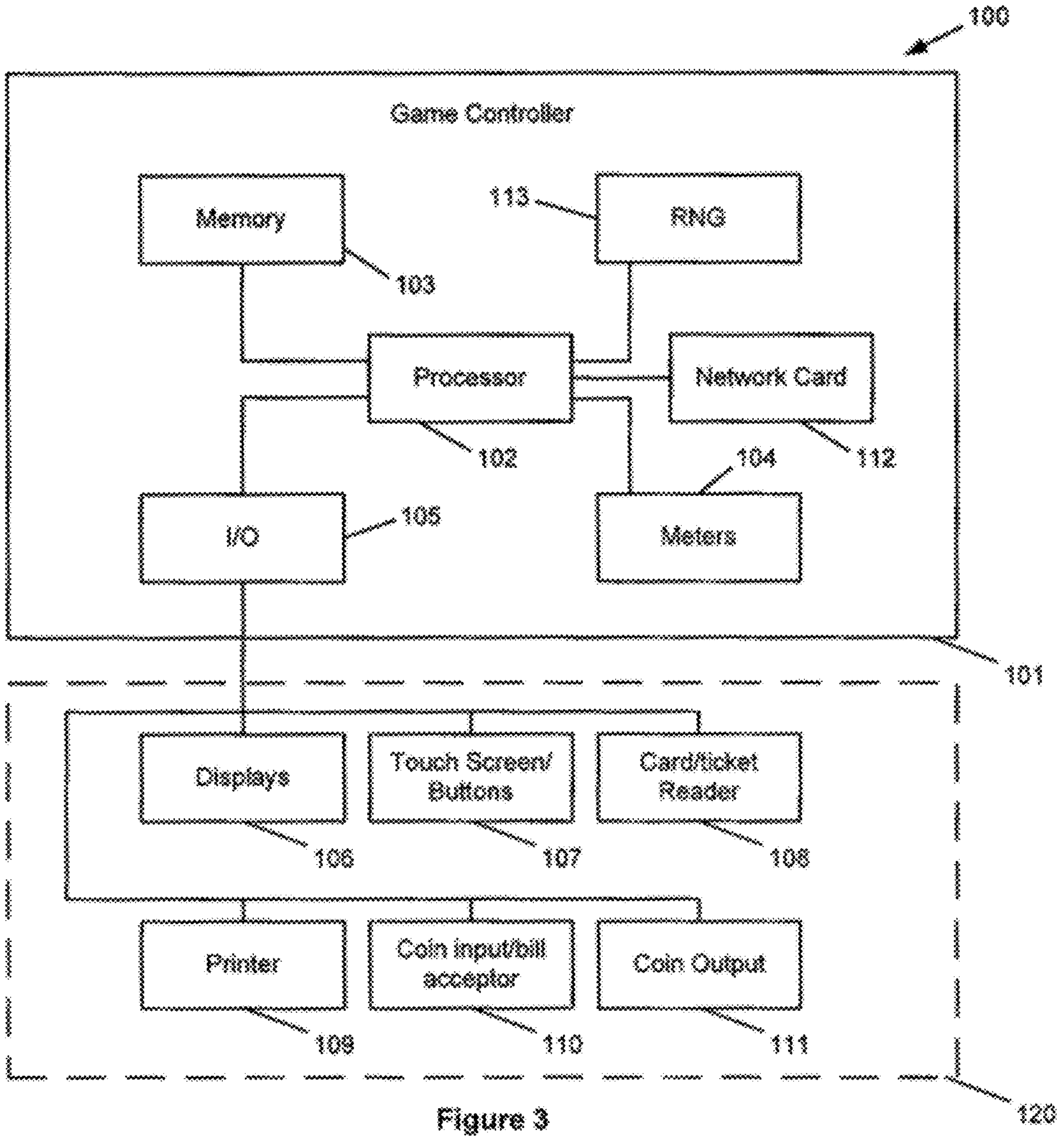
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 include one or more displays 106, a touch screen and/or buttons 107, a card and/or ticket reader 108, a printer 109, a bill acceptor and/or coin input mechanism 110 and a coin output mechanism 111. Additional hardware may be included as part of the gaming machine 100, or hardware may be omitted based on the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
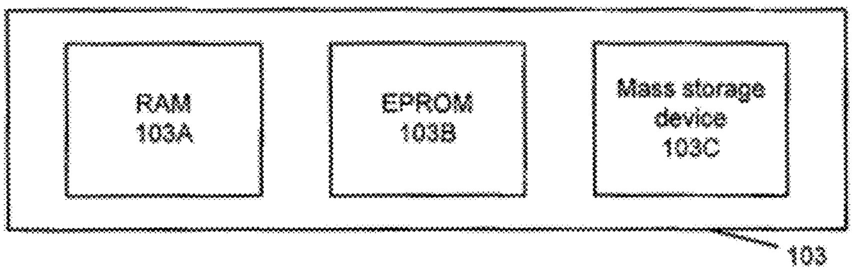
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
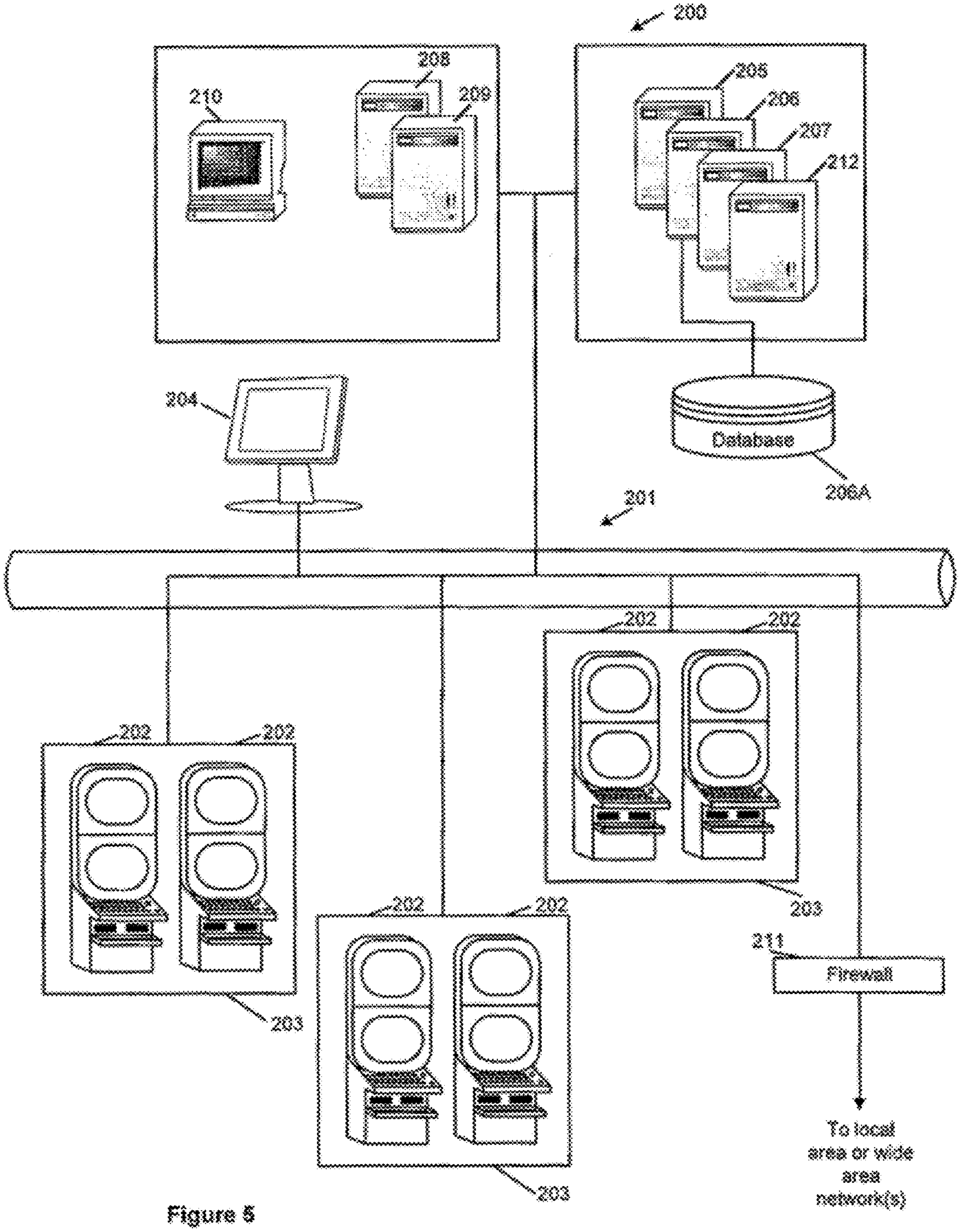
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine

202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games depending on the terminals.

Further detail of gaming system

Figure 6:
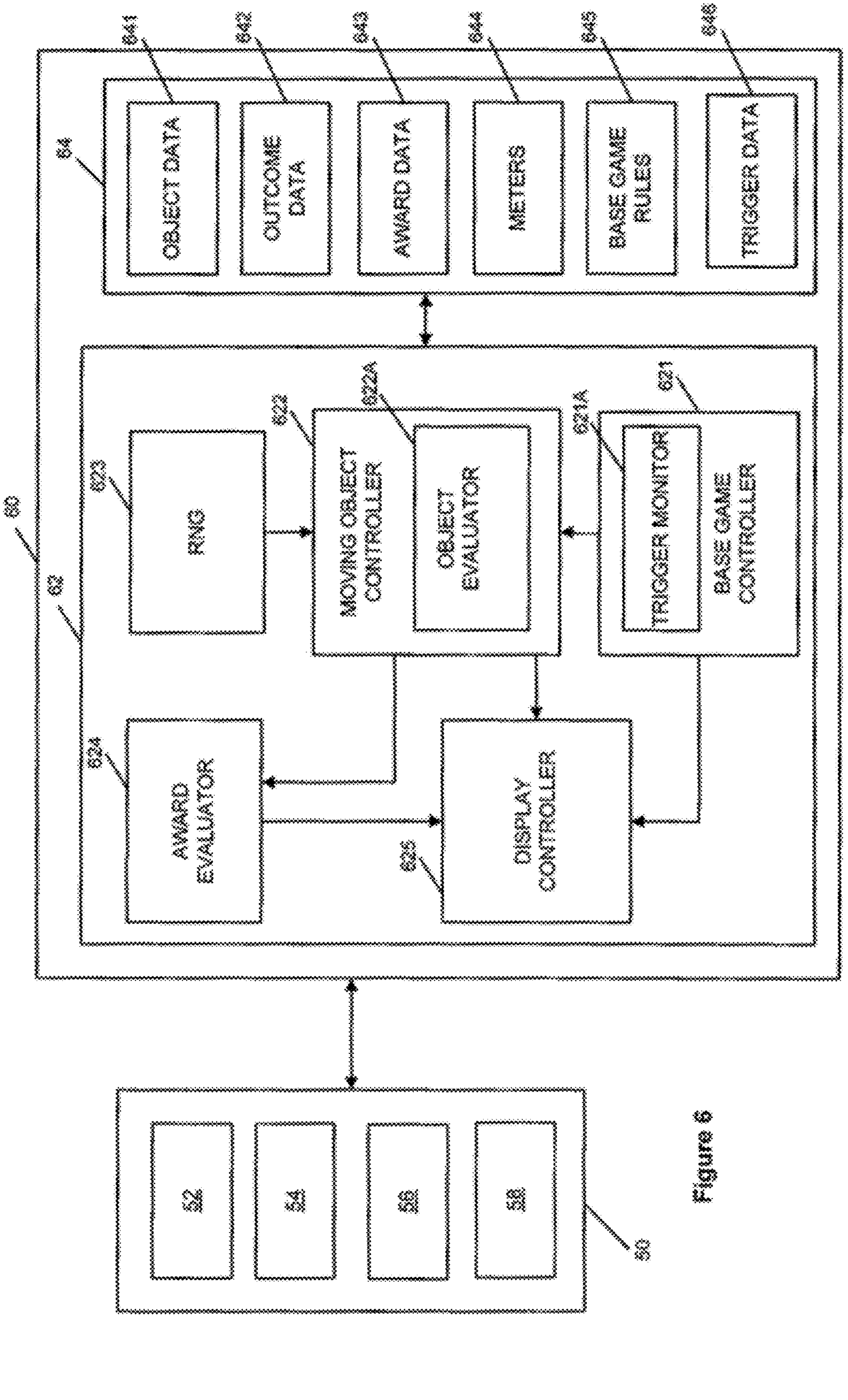
FIG. 6 is a further block diagram of a gaming system.

Referring now to FIG. 6, a player operates credit mechanism 52 to establish a credit on the game controller which is stored as meter data 644. A player than operates game play mechanism 56 to place a bet. The bet which is placed will depend on the nature of the base game and how bets can be placed in the base game.

In the embodiment, the base game is a spinning reel type game where a player selects a number of lines to play which are known as "pay" or "win" lines and an amount to bet per line. These amounts are provided to the base game controller 621 which carries out a base game in accordance with base game rules 645 including determining whether to award any prizes. The base game controller controls the display 54 to display the outcome by means of display controller 625 and updates meters 644 to reflect the deduction of credit for the bet and the addition of any wins by virtue of the outcome of the base game. The base game controller 621 has a trigger monitor 621A for monitoring play in the base game to determine when to trigger a display of moving objects based on trigger data 646 which specifies how the display of moving objects is triggered. For example, the trigger may be random (for example, determined by obtaining a value from random number generator (RNG) 623 and comparing it to a trigger value), occur in response to a symbol combination, occur in response to a defined turnover, or occur in response to a system event.

Once, the moving objects are triggered, moving object controller 622 causes display controller to display the objects specified by object data 641 moving on display 54. For example, the objects may be coins which fall from the top of the display 54 past a plurality of potential stopping positions in the form of the display positions of symbols from a plurality of reels of a spinning reel game of the base game.

In one embodiment, moving object controller 622 controls how the objects move based on an evaluation made by object evaluator 622A. The object evaluator 622A selects one of a plurality of outcomes from outcome data 642 using RNG 623. At least one of the outcomes indicates that the object is to be displayed as relating to an award event and hence, is to be stopped at a stopping place on display 54. Another outcome results in the object passing all possible stopping positions. There may be more than one outcome which results in the object stopping. Thus, the moving object controller 622 causes the objects to be displayed as stopping or passing the stopping position(s). In an embodiment, the stopping place, in effect operates as an evaluation place as evaluations occur when objects reach the stopping place which indicates whether the object is to form part of an award evaluation or, indeed, whether an award is to be made. In some embodiments only some of the moving objects are evaluated and others are purely for display purposes.

The objects contribute to an award event evaluated by award evaluator 624 based on award data. The available awards may include a jackpot award. The outcome of the award evaluation is then displayed by display controller 625 on display 54. In an embodiment, the award evaluator 624 operates in respect of each stopped object, in turn. In another embodiment, once all the objects have been displayed, the award evaluator 624 determines whether an award applies.

Persons skilled in the art will appreciate that while the various modules 621 to 625 are shown as implemented by processor 62, they could be implemented differently. For example the RNG 623 could be implemented by a dedicated circuit.

Figure 7:
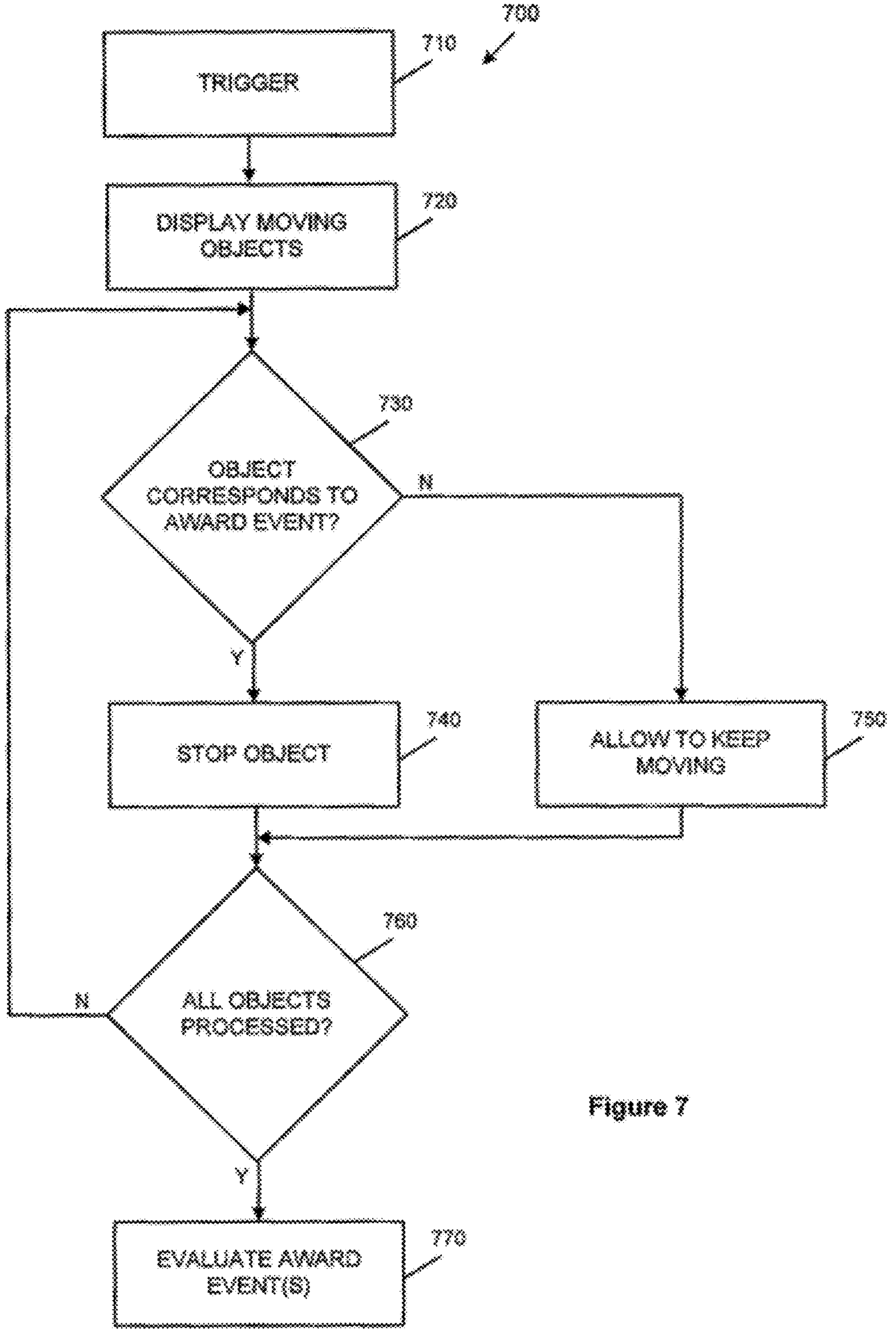
FIG. 7 is a flow chart of an embodiment.

The method 700 is summarised in FIG. 7 where it is shown that after the moving objects trigger 710 a display of them moving 720 begins. Each object is evaluated to determine 730 whether it corresponds to an award event. On this basis, award event objects are stopped 740 and other objects keep moving 750. In one example, once all objects are processed 760, the award events are evaluated 770.

Persons skilled in the art will appreciate that the embodiment could be used with other base games, for example, rather than a spinning reel type base game, the base game could be a poker game, a dice game or the like.

Further, the movement might be different, for example from one side of the machine to another. In an embodiment, the objects move while the base game continues "underneath" the moving object display. In another embodiment, the objects may move in an area not used by the base game, for example on a top box or to the left and/or right of the reels of a spinning reel game (for example, one implemented on a wide screen display (e.g. 16:9 aspect ratio))

In some embodiments, all of the objects stop and the evaluation involves revealing the type of outcome they correspond to one or more evaluation places.

EXAMPLES

Example 1

Figure 8:
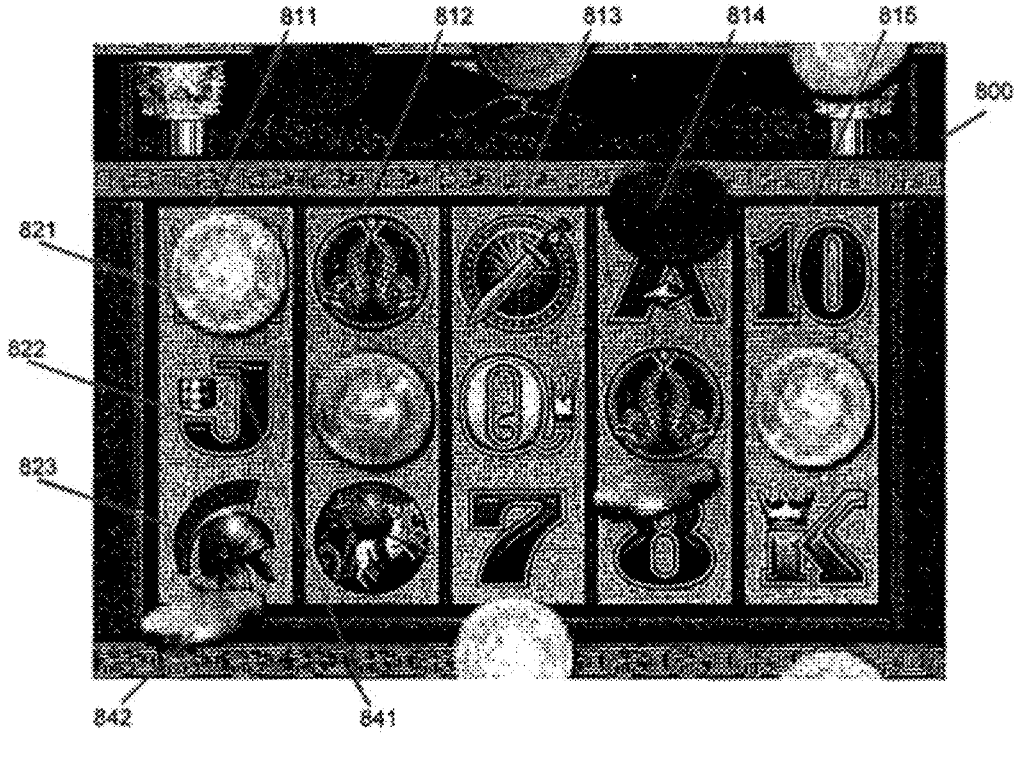
FIG. 8 is an exemplary screen shot.

FIG. 8 shows an exemplary display of a first example where objects in the form of coins fall past the symbols shown in three rows 821 to 823 of five reels 811 to 815 which define a set of 15 display positions in a base game each of which is a potential stopping place. The coins fall over the display matrix down the various reels and either stop at a stopping place as exemplified by coin 841 or continue past the display as exemplified by coin 842. Coins which stop can display either a potential jackpot winning side or an alternative prize side. In the embodiment, the object evaluator 622A assigns one of three outcomes to each coin randomly: stop showing jackpot, stop showing alternative prize, and keep moving. A person skilled in the art will appreciate that the random allocation of outcomes may be weighted.

The outcome of the "coin shower" triggered in this manner can be controlled in a number of ways including by defining the number of coins that are dropped, defining a turnover or time period to elapse between shower, or defining the number and sides of the coins that stop. The prize awarded for the outcome will be specified in the game rules. e.g. if 3 coins are stopped anywhere on the reels, the player will be given 3 chances at a jackpot feature game, e.g. if 3 coins are stopped anywhere on the reels are mini jackpot is immediately awarded, if 4 coins are stopped the minor jackpot is awarded and if 5 coins are stopped the major jackpot is awarded e.g. if a coin is stopped with a "jackpot" side revealed, 1 chance is given at winning the jackpot, if a coin is stopped with a different prize revealed, then that prize is paid."

In an alternative embodiment, coins may continue to stick until a designated number of display positions are filled, for example, all the display positions.

In a further alternative example, all the coins may stop such that their movement solely indicates which of the display positions they will fill. For example, one reel may be filled from top to bottom whereas another reel may be randomly filled from bottom to top.

Example 2

In an alternative example there is a display visible in the corner of the display 54 or on a further display where coins continually fall and either pass or stop at a stopping place as play continues in the base game. Each coin that stops gives the player a chance of winning a jackpot before disappearing. A person skilled in the art will appreciate that other objects can be used. For example, if there are a larger number of outcomes available, an object such as a dice may be appropriate.

It will be understood to persons skilled in the art of the invention that many modifications may be made without departing from the spirit and scope of the invention.

It is to be understood that, if any prior art publication is referred to herein, such reference does not constitute an admission that the publication forms a part of the common general knowledge in the art, in Australia or any other country.

In the claims which follow and in the preceding description of the invention, except where the context indicates otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be appreciated by persons skilled in the art that numerous variations and/or modifications may be made to the invention as shown in the specific embodiments and/or aspects without departing from the spirit or scope of the invention as broadly described. The present embodiments and aspects are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

The invention claimed is:

1. A method of gaming on a gaming machine that is arranged for conducting play of a spinning reel type game having a plurality of reels, the method comprising:

displaying a plurality of objects as moving relative to one or more stopping places and relative to the plurality of reels on a display, wherein the plurality of objects each move independently of each other;

conducting an evaluation in respect of at least some of the objects to determine whether the at least some objects contribute to an award event, wherein the plurality of objects are each assigned at least one of the plurality of outcomes and at least one outcome includes a keep moving outcome that causes the object to continue moving relative to the plurality of reels without stopping at the one or more stopping positions, and wherein an object assigned said keep moving outcome does not contribute to an award event; and stopping each object that contributes to an event at a stopping place of one or more stopping places.

2. A method as claimed in claim 1, comprising displaying the objects as moving by falling relative to the one or more stopping places.

3. A method as claimed in claim 1 comprising conducting an evaluation in respect of each object.

4. A method as claimed in claim 1, wherein the award event is a jackpot evaluation.

5. A method as claimed in claim 1, wherein the award event is adding a symbol to a display position of a plurality of display positions used in evaluating an award.

6. A method as claimed in claim 5, comprising evaluating a jackpot in respect of the added symbol.

7. A method as claimed in claim 6, wherein a plurality of added symbols are required in order to award the jackpot.

8. A method as claimed in claim 1, comprising displaying the objects as moving relative to a base game.

9. A method as claimed in claim 1, wherein conducting an evaluation comprises selecting one of a set of outcomes for each object.

10. A method as claimed in claim 9, wherein the objects are coins and the sides of the coins correspond to two different outcomes.

11. A method as claimed in claim 1, wherein at least one outcome is represented by an object not stopping at a stopping place.

12. A method as claimed in claim 1, comprising displaying the moving objects in response to a trigger event.

13. A game controller for a gaming machine that is arranged for conducting play of a spinning reel type game having a plurality of reels, the game controller arranged to:

control a display of the gaming machine to display a plurality of objects as moving relative to one or more stopping places and relative to the plurality of reels on the display, wherein the plurality of objects each move independently of each other;

conduct an evaluation in respect of at least some of the objects to determine whether the at least some objects contribute to an award event, wherein the plurality of objects are each assigned at least one of the plurality of outcomes and at least one outcome includes a keep moving outcome that causes the object to continue moving relative to the plurality of reels without stopping at the one or more stopping positions, and wherein an object assigned said keep moving outcome does not contribute to an award event; and stop each object that contributes to an event at a stopping place of one or more stopping places.

14. A game controller as claimed in claim 13, comprising a moving object controller arranged to control display of the moving and stopping of objects.

15. A game controller as claimed in claim 13, comprising an evaluator arranged to conduct the evaluation.

16. A game controller as claimed in claim 13, constituted by a processor arranged to execute program code stored in a memory.

17. A game controller as claimed in claim 13, arranged to control the display to display the objects as moving by falling relative to the one or more stopping places.

18. A game controller as claimed in claim 13, arranged to conduct an evaluation in respect of each object.

19. A game controller as claimed in claim 13, wherein the award event is a jackpot evaluation.

20. A game controller as claimed in claim 13, wherein the award event is adding a symbol to a display position of a plurality of display positions used in evaluating an award.

21. A game controller as claimed in claim 20, arranged to evaluate a jackpot in respect of the added symbol.

22. A game controller as claimed in claim 21, wherein a plurality of added symbols are required in order to award the jackpot.

23. A game controller as claimed in claim 13, arranged to control the display to display the objects as moving relative to a base game.

24. A game controller as claimed in claim 13, arranged to conduct an evaluation by selecting one of a set of outcomes for each object.

25. A game controller as claimed in claim 24, wherein the objects are coins and the sides of the coins correspond to two different outcomes.

26. A game controller as claimed in claim 13, wherein at least one outcome is represented by an object not stopping at a stopping place.

27. A game controller as claimed in claim 13, arranged to cause the display to display the moving objects in response to a trigger event.

28. A gaming machine that is arranged for conducting play of a spinning reel type game having a plurality of reels, the gaming machine comprising:

a display; and a game controller arranged to:

control the display to display a plurality of objects as moving relative to one or more stopping places and relative to the plurality of reels, wherein the plurality of objects each move independently of each other;

conduct an evaluation in respect of at least some of the objects to determine whether the at least some objects contribute to an award event, wherein the plurality of objects are each assigned at least one of the plurality of outcomes and at least one outcome includes a keep moving outcome that causes the object to continue moving relative to the plurality of reels without stopping at the one or more stopping positions, and wherein an object assigned said keep moving outcome does not contribute to an award event; and stop each object that contributes to an event at a stopping place of one or more stopping places on the display.

29. A gaming machine as claimed in claim 28, wherein the display forms part of a player interface comprising a game play mechanism operable by a player to play a game during which the objects are displayed.

30. A gaming machine as claimed in claim 28, wherein the game controller comprises a moving object controller arranged to control display of the moving and stopping of objects.

31. A gaming machine as claimed in claim 28, wherein the game controller comprises an evaluator arranged to conduct the evaluation.

32. A gaming machine as claimed in claim 28, wherein the game controller is constituted by a processor arranged to execute program code stored in a memory.

33. A gaming machine as claimed in claim 28, arranged to display the objects as moving by falling relative to the one or more stopping places.

34. A gaming machine as claimed in claim 28, wherein the game controller is arranged to conduct an evaluation in respect of each object.

35. A gaming machine as claimed in claim 28, wherein the award event is a jackpot evaluation.

36. A gaming machine as claimed in claim 28, wherein the award event is adding a symbol to a display position of a plurality of display positions used in evaluating an award.

37. A gaming machine as claimed in claim 36, arranged to evaluate a jackpot in respect of the added symbol.

38. A gaming machine as claimed in claim 36, wherein a plurality of added symbols are required in order to award the jackpot.

39. A gaming machine as claimed in claim 28, arranged to display the objects as moving relative to a base game.

40. A gaming machine as claimed in claim 28, wherein the game controller is arranged to conduct an evaluation by selecting one of a set of outcomes for each object.

41. A gaming machine as claimed in claim 40, wherein the objects are coins and the sides of the coins correspond to two different outcomes.

42. A gaming machine as claimed in claim 28, wherein at least one outcome is represented by an object not stopping at a stopping place.

43. A gaming machine as claimed in claim 28, arranged to display the moving objects in response to a trigger event.

44. A computer readable storage device or storage disc including computer program code which when executed causes a processor to implement a method of gaming on a gaming machine that is arranged for conducting play of a spinning reel type game having a plurality of reels, the method comprising:

displaying a plurality of objects as moving relative to one or more stopping places and relative to the plurality of reels on a display, wherein the plurality of objects each move independently of each other;

conducting an evaluation in respect of at least some of the objects to determine whether the at least some objects contribute to an award event, wherein the plurality of objects are each assigned at least one of the plurality of outcomes and at least one outcome includes a keep moving outcome that causes the object to continue moving relative to the plurality of reels without stopping at the one or more stopping positions, and wherein an object assigned said keep moving outcome does not contribute to an award event; and stopping each object that contributes to an event at a stopping place of one or more stopping places.

* * * * *

UNITED STATES PATENT AND TRADEMARK OFFICE

CERTIFICATE OF CORRECTION

PATENT NO. : 8,702,498 B2
APPLICATION NO. : 13/340099
DATED : April 22, 2014
INVENTOR(S) : Antoon Christiaan Visser It is certified that error appears in the above-identified patent and that said Letters Patent is hereby corrected as shown below:

In the Claims

Column 10, line 57, between “some” and “objects” insert -- of the --.

Column 11, line 37, between “some” and “objects” insert -- of the --.

Column 12, line 30, between “some” and “objects” insert -- of the --.

Column 14, line 9, between “some” and “objects” insert -- of the --.

Signed and Sealed this
Twenty-ninth Day of July, 2014

Michelle K. Lee

Michelle K. Lee
*Deputy Director of the United States Patent and Trademark Office*